(12) United States Patent
Takada et al.

(10) Patent No.: US 11,270,659 B2
(45) Date of Patent: Mar. 8, 2022

(54) LIQUID CRYSTAL DISPLAY APPARATUS

(71) Applicants: SAKAI DISPLAY PRODUCTS CORPORATION, Sakai (JP); SHARP KABUSHIKI KAISHA, Sakai (JP)

(72) Inventors: Ichiro Takada, Sakai (JP); Kentaroh Irie, Sakai (JP); Mitsuaki Hirata, Sakai (JP); Fumikazu Shimoshikiryoh, Sakai (JP)

(73) Assignees: SAKAI DISPLAY PRODUCTS CORPORATION, Sakai (JP); SHARP KABUSHIKI KAISHA, Sakai (JP)

( * ) Notice: Subject to any disclaimer, the term of this patent is extended or adjusted under 35 U.S.C. 154(b) by 17 days.

(21) Appl. No.: 16/814,456

(22) Filed: Mar. 10, 2020

(65) Prior Publication Data

US 2020/0294460 A1 Sep. 17, 2020

Related U.S. Application Data

(60) Provisional application No. 62/817,310, filed on Mar. 12, 2019.

(51) Int. Cl.
*G09G 3/36* (2006.01)
*G02F 1/1337* (2006.01)

(52) U.S. Cl.
CPC ..... *G09G 3/3648* (2013.01); *G02F 1/133788* (2013.01); *G02F 1/133742* (2021.01);
(Continued)

(58) Field of Classification Search
CPC .............. G09G 3/3648; G09G 3/3674; G09G 2300/0426; G09G 2320/0626;
(Continued)

(56) References Cited

U.S. PATENT DOCUMENTS

2003/0103046 A1* 6/2003 Rogers ..................... G09G 3/34
345/204
2007/0159571 A1* 7/2007 Yang ................. G02F 1/136259
349/54
(Continued)

FOREIGN PATENT DOCUMENTS

WO 2006/132369 A1 12/2006
WO 2017/057210 A1 4/2017

*Primary Examiner* — Shaheda A Abdin
(74) *Attorney, Agent, or Firm* — ScienBiziP, P.C.

(57) ABSTRACT

A liquid crystal display apparatus includes: a liquid crystal display panel having a first substrate, a second substrate, and a vertical alignment type liquid crystal layer; and a control circuit configured to generate a display signal voltage. The first substrate has pixel electrodes to which the display signal voltage is applied, and a first alignment film. The second substrate has a counter electrode to which a common voltage is applied, and a second alignment film. Each pixel has liquid crystal domains having different reference alignment directions defined by the first and second alignment films. The pixel electrode has slits. The control circuit is configured to generate, as the display signal voltage, a voltage obtained by adding a predetermined offset voltage to an original voltage corresponding to a gray level. The offset voltage is substantially the same for gray levels higher than or equal to a predetermined intermediate gray level.

10 Claims, 12 Drawing Sheets

(52) U.S. Cl.
CPC .... *G02F 2201/123* (2013.01); *G02F 2203/30* (2013.01); *G09G 3/3674* (2013.01); *G09G 2300/0426* (2013.01); *G09G 2320/0626* (2013.01)

(58) Field of Classification Search
CPC ... G02F 1/133788; G02F 2001/133742; G02F 2203/30; G02F 2201/123
See application file for complete search history.

(56) References Cited

U.S. PATENT DOCUMENTS

| | | | |
|---|---|---|---|
| 2009/0002588 A1* | 1/2009 | Lee | G02F 1/133707 349/42 |
| 2009/0284703 A1 | 11/2009 | Shoraku et al. | |
| 2010/0033413 A1* | 2/2010 | Song | G09G 3/3655 345/89 |
| 2017/0090255 A1* | 3/2017 | Murata | G02F 1/1337 |
| 2018/0284544 A1 | 10/2018 | Shimoshikiryoh et al. | |

* cited by examiner

FIG.13A  ACTIVE MATRIX SUBSTRATE SIDE
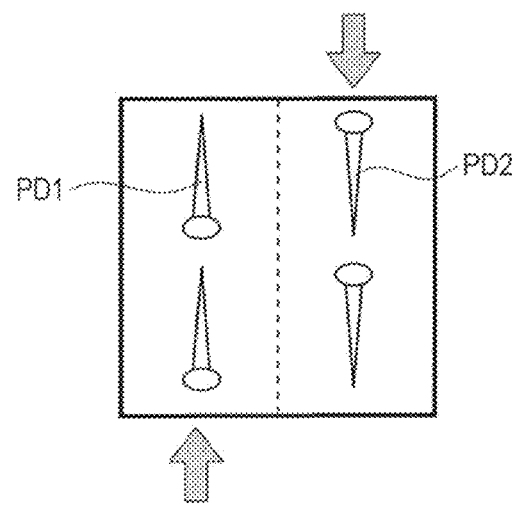
FIG.13B  COUNTER SUBSTRATE SIDE
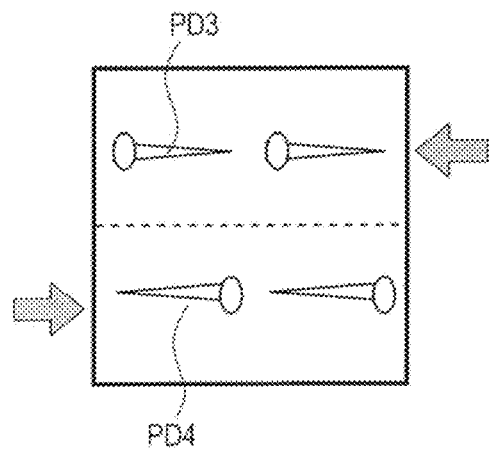
FIG.13C  LIQUID CRYSTAL LAYER
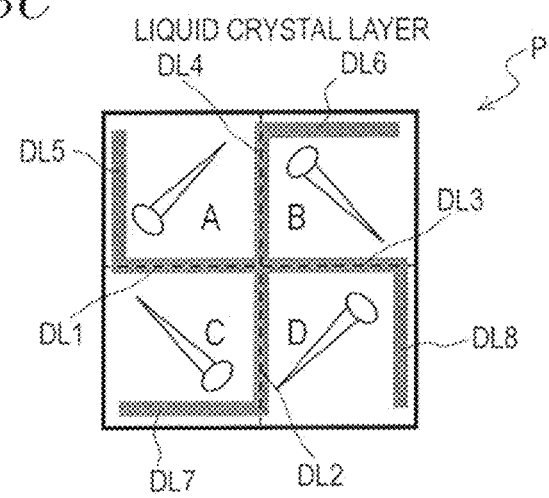

LIQUID CRYSTAL DISPLAY APPARATUS

BACKGROUND

1. Technical Field

The present invention relates to liquid crystal display apparatuses, and more particularly, to a liquid crystal display apparatus which includes a vertical alignment type liquid crystal layer and in which pretilt directions of crystal molecules are defined by ligament films.

2. Description of the Related Art

Among the known techniques of improving the viewing angle characteristics of a vertical alignment (VA) mode liquid crystal display apparatus is the alignment division structure (multi-domain structure), in which a plurality of liquid crystal domains are formed in a pixel. The 4D-reverse twisted nematic (RTN) mode has in recent years been proposed as a technique of forming the alignment division structure.

In the 4D-RTN mode, the alignment division structure is formed by defining pretilt directions of liquid crystal molecules using alignment films. A 4D-RTN mode liquid crystal display apparatus is disclosed in, for example, international Publication WO2006/132369. In the liquid crystal display apparatus disclosed in International Publication WO2006/132369, a four-domain structure is formed by defining pretilt directions using alignment films. Specifically, when a voltage is applied to the liquid crystal layer, four liquid crystal domains are formed in a pixel. Such a four-domain structure is also simply called a 4D structure.

In addition, in the liquid crystal display apparatus disclosed in International Publication WO2006/132369, a pretilt direction defined by one of the pair of alignment films facing each other with the liquid crystal layer interposed therebetween, is about 90° different from a pretilt direction defined by the other alignment film. Therefore, when a voltage is applied, liquid crystal molecules take twisted alignment. As can be understood from the disclosure of International Publication WO2006/132369, in the 4D-RTN mode, the four liquid crystal domains are typically arranged in a matrix of two rows and two columns in a pixel.

International Publication WO2017/057210 also discloses a VA mode liquid crystal display apparatus in which the alignment division structure is formed by defining pretilt directions using alignment films. In the liquid crystal display apparatus disclosed in International Publication WO2017/057210, a pretilt direction defined by one of the pair of alignment films is antiparallel to a pretilt direction defined by the other alignment film. Therefore, when a voltage is applied, the liquid crystal molecules do not form twisted alignment. The display mode disclosed in International Publication WO2017/057210 is called a 4D-electrically controlled birefringence (ECB) mode. In the liquid crystal display apparatus of International Publication WO2017/057210, four liquid crystal domains are arranged in a matrix of four rows and one column in a pixel.

International Publication WO2017/057210 also discloses a configuration in which slits extending in parallel to the director of a liquid crystal domain are formed in a pixel electrode. By forming such slits, the width of a dark line occurring in a pixel can be reduced, resulting in an improvement in transmittance.

SUMMARY

Better viewing angle characteristics can be obtained by modified VA mode techniques such as the 4D-RTN mode and the 4D-ECB mode (the alignment division structure defined by alignment films). However, the present inventors' study has demonstrated that in the case where slits are formed in a pixel electrode, the optimum common voltage deviates, so that polarity nonuniformity occurs in an effective voltage applied to the liquid crystal layer (this phenomenon is hereinafter referred to as "DC deviation"), and therefore, burn-in of a display pattern may occur.

With the above problem in mind, the present invention has been made. It is an object of the present invention to prevent or reduce the occurrence of burn-in caused by DC deviation in a VA mode liquid crystal display apparatus in which the alignment division structure is formed by alignment films defining pretilt directions, and slits are formed in a pixel electrode.

This specification discloses liquid crystal display apparatuses as set forth in the following items.

[Item 1]

A liquid crystal display apparatus comprising:
a liquid crystal display panel having a plurality of pixels, and having a first substrate, a second substrate facing the first substrate, and a vertical alignment type liquid crystal layer provided between the first and second substrates; and
a control circuit configured to receive an input display signal indicating gray levels to be represented by the plurality of pixels, and generate a display signal voltage to be supplied to each of the plurality of pixels,
wherein
the first substrate has a pixel electrode provided for each of the plurality of pixels, the display signal voltage being applied to the pixel electrode, and a first alignment film provided between the pixel electrodes and the liquid crystal layer,
the second substrate has a counter electrode facing the pixel electrode, a common voltage being applied to the counter electrode, and a second alignment film provided between the counter electrode and the liquid crystal layer,
each of the plurality of pixels has a plurality of liquid crystal domains having different reference alignment directions defined by the first and second alignment films,
the pixel electrode has a plurality of slits,
the control circuit is configured to generate, as the display signal voltage, a voltage obtained by adding a predetermined offset voltage to an original voltage corresponding to a gray level, and
the offset voltage is substantially the same for gray levels higher than or equal to a predetermined intermediate gray level.

[Item 2]

The liquid crystal display apparatus according to Item 1, wherein
the predetermined intermediate gray level is higher than or equal to a gray level of 31/255.

[Item 3]

The liquid crystal display apparatus according to Item 1 or 2, wherein
the predetermined intermediate gray level is lower than or equal to a gray level of 214/255.

[Item 4]

The liquid crystal display apparatus according to Item 1, wherein
the offset voltage is substantially the same for all gray levels.

[Item 5]

The liquid crystal display apparatus according to any of Items 1-4, wherein the plurality of liquid crystal domains include a first liquid crystal domain in which the reference alignment direction is a first direction, a second liquid crystal domain in which the reference alignment direction is a second direction different from the first direction, a third liquid crystal domain in which the reference alignment direction is a third direction different from the first and second directions, and a fourth liquid crystal domain in which the reference alignment direction is a fourth direction different from the first, second, and third directions.

[Item 6]

The liquid crystal display apparatus according to Item 5, wherein the plurality of slits include a first slit which is formed in a region corresponding to the first liquid crystal domain, extending substantially in parallel to the first direction, a second slit which is formed in a region corresponding to the second liquid crystal domain, extending substantially in parallel to the second direction, a third slit which is formed in a region corresponding to the third liquid crystal domain, extending substantially in parallel to the third direction, and a fourth slit which is formed in a region corresponding to the fourth liquid crystal domain, extending substantially in parallel to the fourth direction.

[Item 7]

The liquid crystal display apparatus according to Item 5 or 6, wherein in each of the plurality of pixels, the first, second, third, and fourth liquid crystal domains are arranged in a pixel lengthwise direction.

[Item 8]

The liquid crystal display apparatus according to any of Items 1-7, wherein the first and second alignment films are each a photoalignment film.

[Item 9]

The liquid crystal display apparatus according to any of Items 1-8, wherein in each of the plurality of liquid crystal domains, a pretilt direction defined by the first alignment film is substantially antiparallel to a pretilt direction defined by the second alignment film.

According to an embodiment of the present invention, the occurrence of burn-in caused by DC deviation can be prevented or reduced in a VA mode liquid crystal display apparatus in which an alignment division structure is formed by alignment films defining pretilt directions, and slits are formed in a pixel electrode.

BRIEF DESCRIPTION OF THE DRAWINGS

FIG. 10 is a graph showing a relationship between effective voltage and source center voltage in a liquid crystal display apparatus for which adjustment similar to that in Comparative Example 1 was performed, in a plurality of examples having different widths of the slit 11a.

FIG. 13A is a diagram for describing a method for obtaining the alignment division structure of the pixel P, showing pretilt directions PD1 and PD2 that are defined by a first alignment film 12 provided on an active matrix substrate 10.

FIG. 13B is a diagram for describing the method for obtaining the alignment division structure of the pixel P, showing pretilt directions PD3 and PD4 that are defined by a second alignment film 22 provided on a counter substrate 20.

FIG. 13C is a diagram for describing the method for obtaining the alignment division structure of the pixel P, showing tilted directions (directors) that are defined when a voltage is applied to a liquid crystal layer 30 after the active matrix substrate 10 and the counter substrate 20 are attached together.

DETAILED DESCRIPTION

Figure 1:
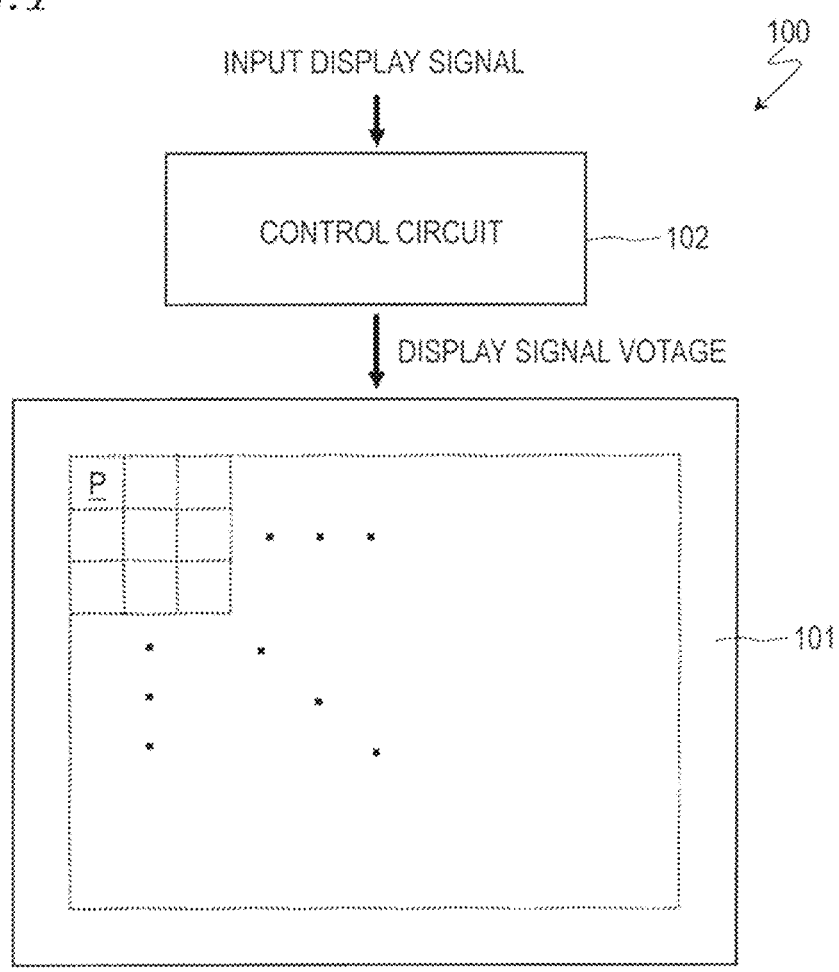
FIG. 1 is a diagram schematically showing a liquid crystal display apparatus 100 according to an embodiment of the present invention.

It is considered that DC deviation causes burn-in for the following reason.

In VA mode liquid crystal display apparatuses, the capacitance value of the liquid crystal capacitance varies depending on the magnitude of a voltage applied to the liquid crystal layer, and therefore, the magnitude of the pulling voltage with respect to the drain voltage (pixel electrode voltage) varies depending on the gray level. To address this, conventionally, the source voltage is offset so that flicker is minimized, whereby the optimum common voltage matches irrespective of the gray level. Note that in the case where slits are formed in a pixel electrode, flexoelectric polarization is likely to occur in the liquid crystal layer, leading to the occurrence of a DC offset. In a conventional adjustment technique, a DC voltage is applied to the alignment films in order to cancel the DC offset, and therefore, DC deviation is likely to occur, leading to the occurrence of burn-in.

A liquid crystal display apparatus according to an embodiment of the present invention has a configuration described below, whereby burn-in caused by DC deviation is prevented or reduced.

Description of Terms

Main terms used herein will be described.

As used herein, the term "vertical alignment type liquid crystal layer" refers to a liquid crystal layer in which liquid crystal molecules are oriented substantially perpendicularly (e.g., at an angle of about 85° or more) to the surface of an alignment film (vertical alignment film). Liquid crystal molecules contained in the vertical alignment type liquid crystal layer have negative dielectric anisotropy. Normally black mode display is carried out by combining the vertical alignment type liquid crystal layer with a pair of polarizers that are arranged in crossed Nicols (i.e., the transmission axes of the polarizers are substantially orthogonal), facing each other with the liquid crystal layer interposed therebetween.

As used herein, the term "pixel" refers to the smallest unit that represents a particular gray level in display, and in the case of color display, corresponds to a unit that represents the gray level of each of R, G, and B, for example. A combination of an R pixel, a G pixel, and a B pixel forms a color display pixel. As used herein, a region (pixel region) of a liquid crystal display apparatus corresponding to a "pixel" in display is also referred to as a "pixel."

The term "pretilt direction" refers to an alignment direction of liquid crystal molecules defined by alignment films, which is an azimuth angle direction in a display plane. The angle at which liquid crystal molecules in this case are oriented relative to the surface of the alignment film is referred to as a "pretilt angle." An aligning process applied to the alignment film (a treatment for imparting, to the alignment film, the ability to define a predetermined pretilt direction) is preferably performed by a photoaligning process as described below.

By changing the combination of pretilt directions defined by a pair of alignment films facing each other with a liquid crystal layer interposed therebetween, a four-domain structure can be formed. When a pixel (pixel region) is divided into four, the pixel has four liquid crystal domains.

Each liquid crystal domain is characterized by a tilted direction (also referred to as a "reference alignment direction") of liquid crystal molecules at or near the center in the layer surface and in the thickness direction of the liquid crystal layer when a voltage is applied to the liquid crystal layer. The tilted direction (reference alignment direction) has a dominant influence on the viewing angle dependency of each domain. Given a vector of a tilted liquid crystal molecule pointing from an end thereof closer to the back substrate toward a farther end thereof (i.e., an end thereof closer to the front substrate) (a vector from the tip toward the head of a pin shown in FIG. 4C described below), the tilted direction is the direction of a component in the substrate surface (a projection on the substrate surface) of the vector, which is an azimuth angle direction. An azimuth angle direction is measured with reference to the horizontal direction in the display plane, and counterclockwise rotations represent positive rotations (when the display plane is compared to a clock face, the three o'clock direction is denoted as an azimuth angle of 0°, and counterclockwise rotations represent positive rotations). If the tilted directions of the four liquid crystal domains are set so that the angle between any two of the tilted directions is substantially equal to an integer multiple of 90° (e.g., the 10:30 direction, 7:30 direction, 4:30 direction, and 1:30 direction), the viewing angle characteristics are averaged, and therefore, good display can be obtained. In addition, it is preferable that the four liquid crystal domains have substantially equal areas in the pixel region in terms of uniformity of viewing angle characteristics.

A vertical alignment type liquid crystal layer illustrated in embodiments described below contains liquid crystal molecules having negative dielectric anisotropy (a nematic liquid crystal material having negative dielectric anisotropy). In the vertical alignment type liquid crystal layer, a pretilt direction defined by one of the alignment films is substantially antiparallel to a pretilt direction defined by the other alignment film. A tilted direction (reference alignment direction) is defined which extends in an azimuth angle direction which is substantially the same as one of the two pretilt directions that is defined by the alignment film on the back substrate. When a voltage is applied to the liquid crystal layer, liquid crystal molecules do not form twisted alignment. The pair of alignment films preferably define substantially equal pretilt angles.

An aligning process to the alignment films is preferably a photoaligning process in terms of mass productivity. The photoaligning process can be carried out in a contactless manner, and therefore, static electricity does not occur, which would occur due to rubbing of a rubbing process, leading to prevention or reduction of yield decrease. In addition, by employing a photoalignment film containing a photosensitive group, variations in pretilt angles can be prevented or reduced.

Embodiments of the present invention will now be described with reference to the accompanying drawings. Note that the present invention is in no way limited to embodiments described below.

First Embodiment

A liquid crystal display apparatus 100 according to this embodiment will be described with reference to FIG. 1. The liquid crystal display apparatus 100 of this embodiment performs 4D-ECB mode display. As shown in FIG. 1, the liquid crystal display apparatus 100 includes a liquid crystal display panel 101 and a control circuit 102.

The liquid crystal display panel 101 has a plurality of pixels P. The plurality of pixels P are arranged in a matrix of a plurality of rows and a plurality of columns.

The control circuit 102 is configured to receive an input display signal indicating gray levels which are to be represented by the plurality of pixels P, and generate display signal voltages which are to be supplied to the respective pixels P. The control circuit 102 may have a timing control circuit, scan line drive circuit (gate driver), signal line drive circuit (source driver), etc. All or a portion of the control circuit 102 may be formed integrally (monolithically) with the liquid crystal display panel 101.

In 256-gray level (8-bit) representation, a "gray level of 0" is the minimum gray level corresponding to black display, and a "gray level of 255" is the maximum gray level corresponding to white display. In 1024-gray level (10-bit) representation, a "gray level of 0" is the minimum gray level, and a "gray level of 1023" is the maximum gray level. As used herein, unless otherwise specified, gray levels are as defined in 256-gray level representation, and a gray level of N in 256-gray level representation is denoted as a "gray level of N/255." For example, "displaying with a gray level of 127/255" does not necessarily mean that a liquid crystal display apparatus performs 256-gray level representation, and may also indicate not only a gray level of 127 in 256-gray level representation, but also a gray level of 508 in 1024-gray level representation, etc.

Figure 2:
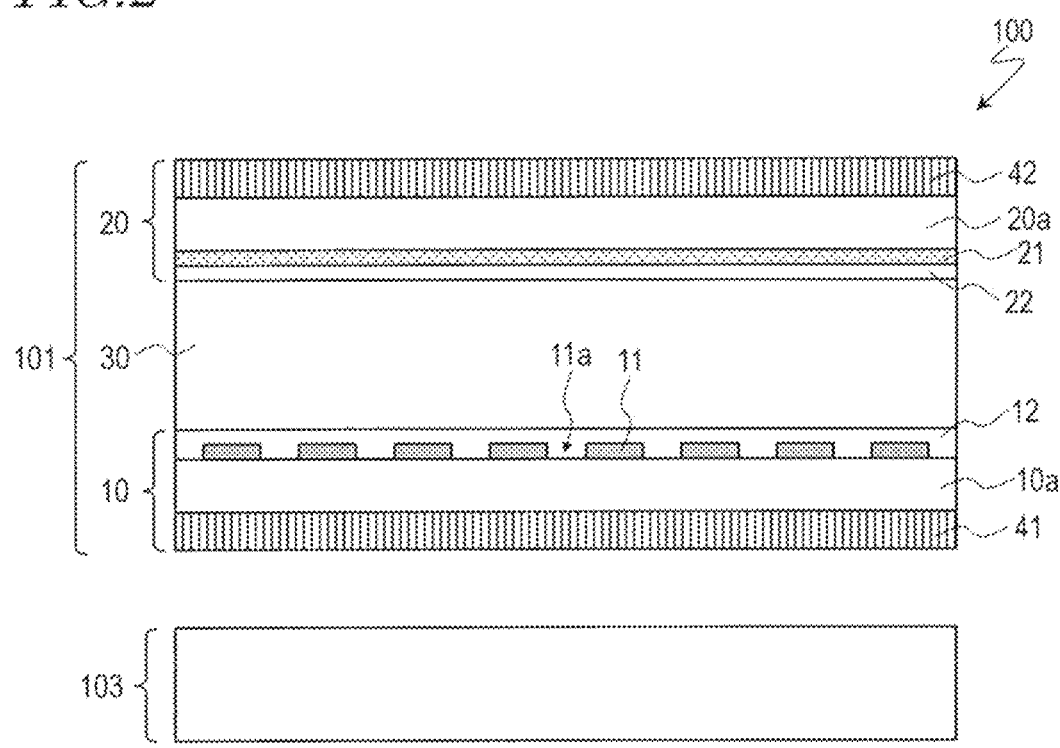
FIG. 2 is a cross-sectional view schematically showing the liquid crystal display apparatus 100.

A configuration of the liquid crystal display apparatus 100 will be more specifically described with reference to FIG. 2. FIG. 2 is a cross-sectional view schematically showing the liquid crystal display apparatus 100. As shown in FIG. 2, the liquid crystal display apparatus 100 includes a backlight (illumination device) 103 in addition to the liquid crystal display panel 101 and the control circuit 102 (not shown in FIG. 2).

The liquid crystal display panel 101 has an active matrix substrate (first substrate) 10, a counter substrate (second substrate) 20 facing the active matrix substrate 10, and a vertical alignment type liquid crystal layer 30 provided between the active matrix substrate 10 and the counter substrate 20. The backlight 103 is disposed at the back of the liquid crystal display panel 101 (opposite side from a viewer).

The active matrix substrate 10 has a pixel electrode 11 provided for each of the plurality of pixels P, and a first alignment film 12 provided between the pixel electrodes 11 and the liquid crystal layer 30 (i.e., provided on the frontmost surface closer to the liquid crystal layer 30 of the active matrix substrate 10). The pixel electrodes 11 and the first alignment film 12 are provided in this order on the surface closer to the liquid crystal layer 30 of a substrate 10a. In other words, the pixel electrodes 11 and the first alignment film 12 are supported by the substrate 10a. The substrate 10a is transparent and has insulating properties. The substrate 10a is, for example, a glass substrate or plastic substrate.

A display signal voltage is applied to each pixel electrode 11. The pixel electrodes 11 are formed of a transparent conductive material (e.g., ITO). Each pixel electrode 11 has a plurality of slits 11a.

Although not shown, the active matrix substrate 10 has, in addition to the pixel electrodes 11 and the first alignment film 12, TFTs electrically coupled to the pixel electrodes 11, gate lines for supplying a scan signal (scan signal voltage) to the TFTs, source lines for supplying a display signal (display signal voltage) to the TFTs, etc.

The counter substrate 20 has a counter electrode (common electrode) 21 facing the plurality of pixel electrodes 11, and a second alignment film 22 provided between the counter electrode 21 and the liquid crystal layer (i.e., provided on the frontmost surface closer to the liquid crystal layer 30 of the counter substrate 20). The counter electrode 21 and the second alignment film 22 are provided in this order on a surface closer to the liquid crystal layer 30 of a substrate 20a. In other words, the counter electrode 21 and the second alignment film 22 are supported by the substrate 20a. The substrate 20a is transparent and has insulating properties. The substrate 20a is, for example, a glass substrate or plastic substrate.

A voltage (common voltage) Vcom common to all pixels is applied to the counter electrode 21. The common voltage Vcom is set to an optimum value for reduction of flicker (hereinafter referred to as an "optimum Vcom"). The counter electrode 21 is formed of a transparent conductive material (e.g., ITO). The counter electrode 21 may be a continuous conductive film formed throughout a display region. Typically, the counter electrode 21 does not have a slit.

Although not shown, the counter substrate 20 has, in addition to the counter electrode 21 and the second photoalignment film 22, a color filter layer and a light-blocking layer (black matrix). The color filter layer typically includes a red color filter, a green color filter, and a blue color filter.

The first alignment film 12 and the second alignment film 22 each have an alignment control force that causes liquid crystal molecules to be oriented substantially perpendicularly to a surface thereof. In this embodiment, the first alignment film 12 and the second alignment film 22 are prepared by a photoaligning process. In other words, the first alignment film 12 and the second alignment film 22 are each a photoalignment film.

The liquid crystal display apparatus 100 further includes a pair of polarizers 41 and 42 facing each other with the liquid crystal layer 30 interposed therebetween. The pair of polarizers 41 and 42 are arranged so that the transmission axes of the polarizers are substantially orthogonal (i.e., in crossed Nicols).

Next, the alignment division structure of each pixel P in the liquid crystal display apparatus 100 will be described with reference to FIG. 3. Note that in the illustrated example, each pixel P is in the shape of a generally rectangle having a lengthwise direction D1 and a widthwise direction D2.

Figure 3:
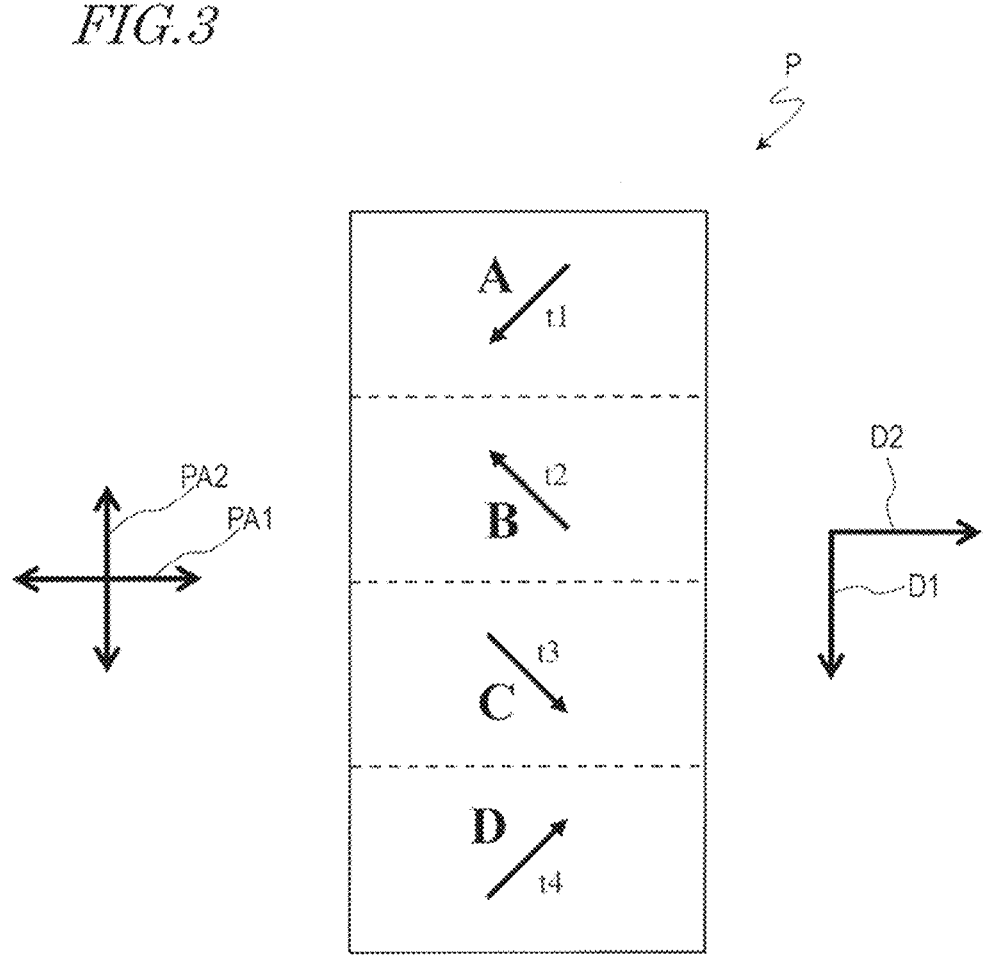
FIG. 3 is a diagram showing an alignment division structure of a pixel P in the liquid crystal display apparatus 100.

As shown in FIG. 3, in each pixel P, when a voltage is applied between the pixel electrode 11 and the counter electrode 21, four liquid crystal domains A, B, C, and D are formed in the liquid crystal layer 30. Four directors (reference alignment direction) t1, t2, t3, and t4 which are representative alignment directions of liquid crystal molecules contained in the liquid crystal domains A, B, C, and D, respectively, have different azimuths.

Assuming that the azimuth angle of the horizontal direction (3 o'clock direction) of the display plane is 0°, the azimuth of the director t1 of the liquid crystal domain A is an about 225° direction, the azimuth of the director t2 of the liquid crystal domain B is an about 135° direction, the azimuth of the director t3 of the liquid crystal domain C is an about 315° direction, and the azimuth of the director t4 of the liquid crystal domain D is an about 45° direction. In other words, the difference between any two of the azimuths of the four directors t1, t2, t3, and t4 of the liquid crystal domains A, B, C, and D is substantially equal to an integer multiple of 90°. Note that as used herein, the about 45° direction, about 135° direction, about 225° direction, and about 315° direction mean a "40°-50° direction," "130°-140° direction," "220°-230° direction," and "310°-320° direction," respectively.

In the example of FIG. 3, in the pixel P, the four liquid crystal domains A, B, C, and D are arranged in a matrix of four rows and one column. More specifically, in the pixel P, the liquid crystal domains A, B, C, and D are arranged downward (i.e., in the lengthwise direction D1 of the pixel) in this order with the domain A highest. The four liquid crystal domains arranged downward in order (i.e., the liquid crystal domains A, B, C, and D) are also hereinafter referred to as a "first liquid crystal domain," "second liquid crystal domain," "third liquid crystal domain," and "fourth liquid crystal domain," respectively. The azimuths of the directors of two adjacent ones of the liquid crystal domains A, B, C, and D are about 90° or about 180° different from each other. More specifically, the azimuth of the director of the first liquid crystal domain (liquid crystal domain A) is about 90° different from the azimuth of the director of the second liquid crystal domain (liquid crystal domain B). The azimuth of the director of the second liquid crystal domain (liquid crystal domain B) is about 180° different from the azimuth of the director of the third liquid crystal domain (liquid crystal domain C). The azimuth of the director of the third liquid crystal domain (liquid crystal domain C) is about 90° different from the azimuth of the director of the fourth liquid crystal domain (liquid crystal domain D).

One of the transmission axes (polarization axes) PA1 and PA2 of the pair of polarizers 41 and 42 is parallel to the horizontal direction of the display plane, and the other is parallel to the vertical direction of the display plane. Therefore, the angles between the transmission axes (polarization axes) PA1 and PA2 of the pair of polarizers 41 and 42 and the azimuths of the directors t1, t2, t3, and t4 of the liquid crystal domains A, B, C, and D are about 45°.

Although FIG. 3 shows an example in which the four liquid crystal domains A, B, C, and D have equal areas in the pixel P, the areas of the four liquid crystal domains A, B, C, and D may not be equal to each other. Note that the differences in area between the four liquid crystal domains A, B, C, and D are preferably reduced to the extent possible in terms of uniformity of viewing angle characteristics. The example four-domain structure shown in FIG. 3 is most preferable (i.e., ideal) in terms of viewing angle characteristics.

Figure 4A:
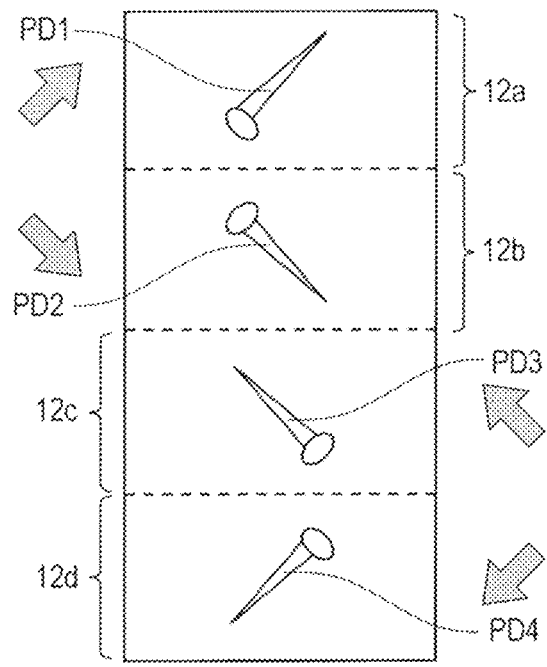
FIG. 4A is a diagram for describing a method for obtaining the alignment division structure of the pixel P, showing pretilt directions PD1, PD2, PD3, and PD4 defined by a first alignment film 12 provided on an active matrix substrate 10.
Figure 4B:
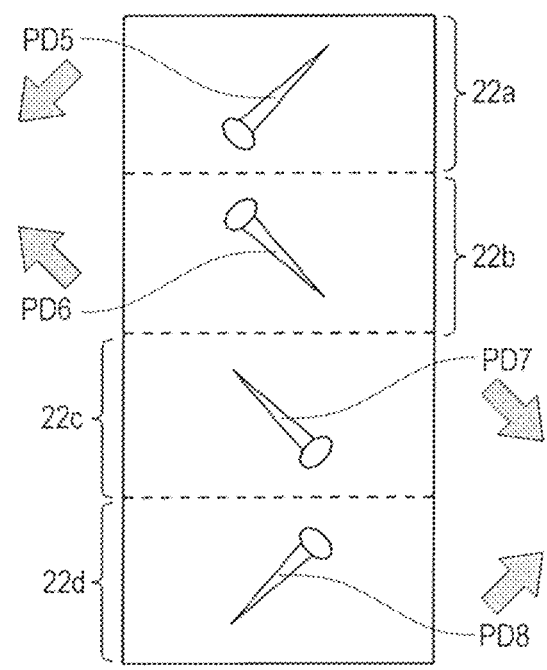
FIG. 4B is a diagram for describing the method for obtaining the alignment division structure of the pixel P, showing pretilt directions PD5, PD6, PD7, and PD8 defined by a second alignment film 22 provided on a counter substrate 20.
Figure 4C:
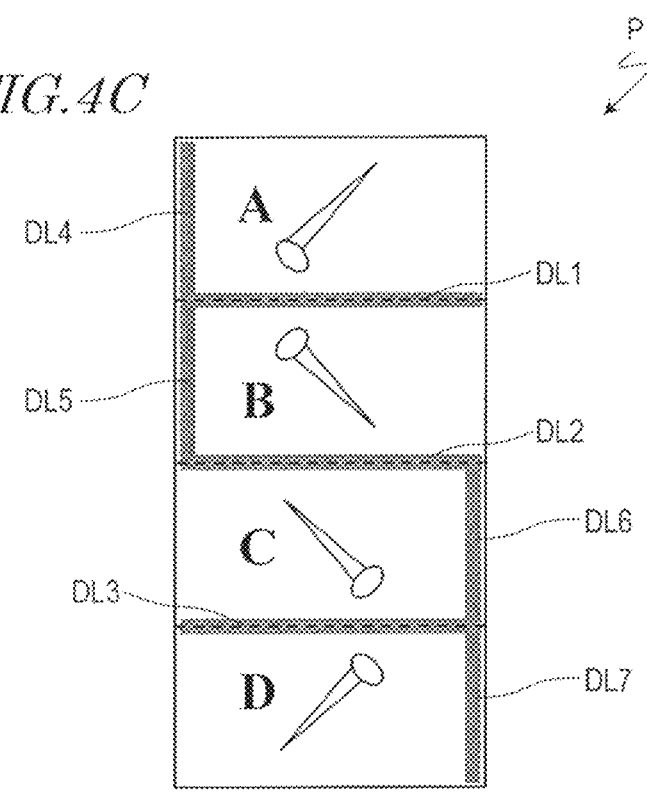
FIG. 4C is a diagram for describing the method for obtaining the alignment division structure of the pixel P, showing tilted directions (directors) defined when a voltage is applied to a liquid crystal layer 30 after the active matrix substrate 10 and the counter substrate 20 are attached together.

Next, an alignment division method for obtaining the alignment division structure of the pixel P will be described with reference to FIGS. 4A, 4B, and 4C. FIG. 4A shows pretilt directions PD1, PD2, PD3, and PD4 defined by the first alignment film 12 provided on the active matrix substrate 10. FIG. 4B shows pretilt directions PD5, PD6, PD7, and PD8 defined by the second alignment film 22 provided on the counter substrate 20. FIG. 4C shows tilted directions (directors) defined when a voltage is applied to the liquid crystal layer 30 after the active matrix substrate 10 and the counter substrate 20 are attached together. Note that FIGS. 4A, 4B, and 4C show the active matrix substrate, the counter substrate, and the liquid crystal layer as viewed from a viewer. Therefore, in FIG. 4A, the alignment film is located closer to the viewer of the drawing sheet than is the substrate, and in FIG. 4B, the alignment film is located deeper from the viewer of the drawing sheet than is the substrate. The pretilt directions and the tilted directions are represented by schematic pins. The head (end portion having a larger area) of a pin represents an end portion closer to the front side (closer to the viewer) of a liquid crystal molecule, and the tip (end portion having a smaller area) of a pin represents an end portion closer to the back side of the liquid crystal molecule.

As shown in FIG. 4A, the first alignment film 12 has, in each pixel P, a first pretilt region 12a, second pretilt region 12b, third pretilt region 12c, and fourth pretilt region 12d that define the first pretilt direction PD1, second pretilt direction PD2, third pretilt direction PD3, and fourth pretilt direction PD4, respectively, which are different from each other. Specifically, the region corresponding to a pixel P of the first alignment film 12 is horizontally divided into four regions. These regions (the first pretilt region, second pretilt region, third pretilt region, and fourth pretilt region) 12a, 12b, 12c, and 12d are subjected to a photoaligning process so as to be able to define the different pretilt directions (first pretilt direction, second pretilt direction, third pretilt direction, and fourth pretilt direction) PD1, PD2, PD3, and PD4. Here, the photoaligning process is carried out by oblique irradiation with ultraviolet light (e.g., linear polarized ultraviolet light) in directions indicated by arrows.

As shown in FIG. 4B, the second alignment film 22 has, in each pixel P, a fifth pretilt region 22a, sixth pretilt region 22b, seventh pretilt region 22c, and eighth pretilt region 22d that define the fifth pretilt direction PD5, sixth pretilt direction PD6, seventh pretilt direction PD7, and eighth pretilt direction PD8, respectively, which are different from each other. Specifically, the region corresponding to a pixel P of the second alignment film 22 is horizontally divided into four regions. These regions (the fifth pretilt region, sixth pretilt region, seventh pretilt region, and eighth pretilt region) 22a, 22b, 22c, and 22d are subjected to a photoaligning process so as to be able to define the different pretilt directions (fifth pretilt direction, sixth pretilt direction, seventh pretilt direction, and eighth pretilt direction) PD5, PD6, PD7, and PD8. Here, the photoaligning process is carried out by oblique irradiation with ultraviolet light (e.g., linear polarized ultraviolet light) in directions indicated by arrows.

By attaching together the active matrix substrate 10 and the counter substrate 20 subjected to the photoaligning processes of FIGS. 4A and 4B, an alignment division pixel (multi-domain pixel) P can be formed as shown in FIG. 4C. In each of the liquid crystal domains A-D, pretilt directions defined by the first alignment film 12 on the active matrix substrate 10 are substantially antiparallel to pretilt directions defined by the second alignment film 22 on the counter substrate 20. In each of the liquid crystal domains A-D, the twisted angle of liquid crystal molecules is substantially 0°.

In the pixel P having the alignment division structure, dark lines DL1-DL7 occur. Specifically, dark lines DL1, DL2, and DL3 occur at boundaries between adjacent liquid crystal domains, and dark lines DL4, DL5, DL6, and DL7 occur near edges of the pixel electrode 11. A reason for the occurrence of dark lines is disclosed in International Publications WO2006/132369 and WO2017/057210, and will not be described herein. The domain arrangement illustrated in FIG. 3 is one of the arrangements in which the total area of dark lines occurring in the pixel P is smallest.

Figure 5:
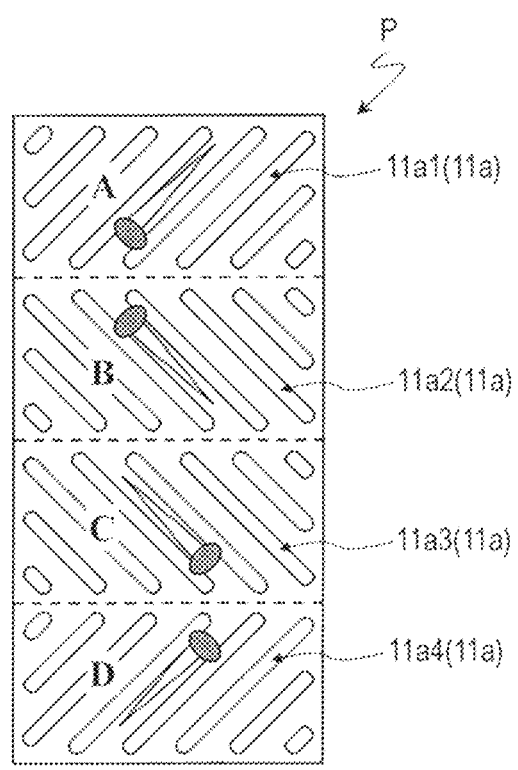
FIG. 5 is a diagram showing a relationship between the directions in which slits 11a formed in a pixel electrode 11 extend, and tilted directions in liquid crystal domains A-D.

As described above, the pixel electrode 11 has the plurality of slits 11a. An arrangement of the slits 11a in the pixel electrode 11 will be described with reference to FIG. 5. FIG. 5 is a diagram showing a relationship between the directions in which the slits 11a extend and the tilted directions in the liquid crystal domains A-D.

As shown in FIG. 5, the plurality of slits 11a include first slits 11a1 formed in a region corresponding to the liquid crystal domain A (first liquid crystal domain), second slits 11a2 formed in a region corresponding to the liquid crystal domain B (second liquid crystal domain), third slits 11a3 formed in a region corresponding to the liquid crystal domain C (third liquid crystal domain), and fourth slits 11a4 formed in a region corresponding to the liquid crystal domain D (fourth liquid crystal domain).

The first slits 11a1 extend substantially in parallel to the tilted direction (director t1) of the liquid crystal domain A. The second slits 11a2 extend substantially in parallel to the tilted direction (director t2) of the liquid crystal domain B. The third slits 11a3 extend substantially in parallel to the tilted direction (director t3) of the liquid crystal domain C. The fourth slits 11a4 extend substantially in parallel to the tilted direction (director t4) of the liquid crystal domain D.

The slits 11a1, 11a2, 11a3, and 11a4 thus formed in the pixel electrode 11, extending substantially in parallel to the tilted directions of the respective corresponding liquid crystal domains, can reduce the width of dark lines and thereby improve transmittance, as disclosed in International Publication WO2017/057210.

Note that the arrangement and number of the plurality of slits 11a are not limited to those of the example of FIG. 5. Although FIG. 5 shows an example in which the slits 11a are disposed substantially throughout the pixel P (i.e., substantially throughout the pixel electrode 11), the slits 11a may be disposed in only a part of the pixel P. In addition, the width of each slit 11a and the distance between two adjacent slits 11a are not particularly limited. However, typically, the width of each slit 11a is 2-4 μm, and the distance between two adjacent slits 11a is 2-4 μm.

Next, the control circuit 102 of the liquid crystal display apparatus 100 will be described.

The control circuit 102 is configured to generate, as a display signal voltage, a voltage which is obtained by adding a predetermined offset voltage to an original voltage corresponding to a gray level. In this embodiment, the offset voltage is substantially the same for gray levels which are higher than or equal to a predetermined intermediate gray level. Here, the term "substantially the same" means that the offset voltage falls within ±10% from the average value in that gray level range (higher than or equal to the predetermined intermediate gray level). The control circuit 102 thus configured can prevent or reduce the occurrence of burn-in caused by DC deviation. A reason for this will now be described.

As described above, conventional VA mode liquid crystal display apparatuses address the problem that the magnitude of the pulling voltage with respect to the drain voltage varies depending on the gray level, by performing adjustment to offset the source voltage and thereby cause the optimum common voltage to match irrespective of the gray level. However, in the case of such an adjustment technique, if slits are formed in a pixel electrode, a DC voltage is applied to the alignment films in order to cancel a DC offset caused by flexoelectric polarization, so that DC deviation occurs, likely leading to burn-in.

In contrast to this, in the liquid crystal display apparatus 100 of this embodiment, the offset voltage is substantially the same for gray levels which are higher than or equal to a predetermined intermediate gray level. This means that for gray levels which are higher than or equal to a predetermined intermediate gray level, a DC offset caused by flexoelectric polarization is not canceled to a further extent (the canceled amount does not exceed that which is canceled for the predetermined intermediate gray level). In other words, the DC voltage applied to the alignment films does not exceed that which is applied for the predetermined intermediate gray level. Therefore, DC deviation is less likely to occur, and therefore, burn-in is less likely to occur.

Figure 6:
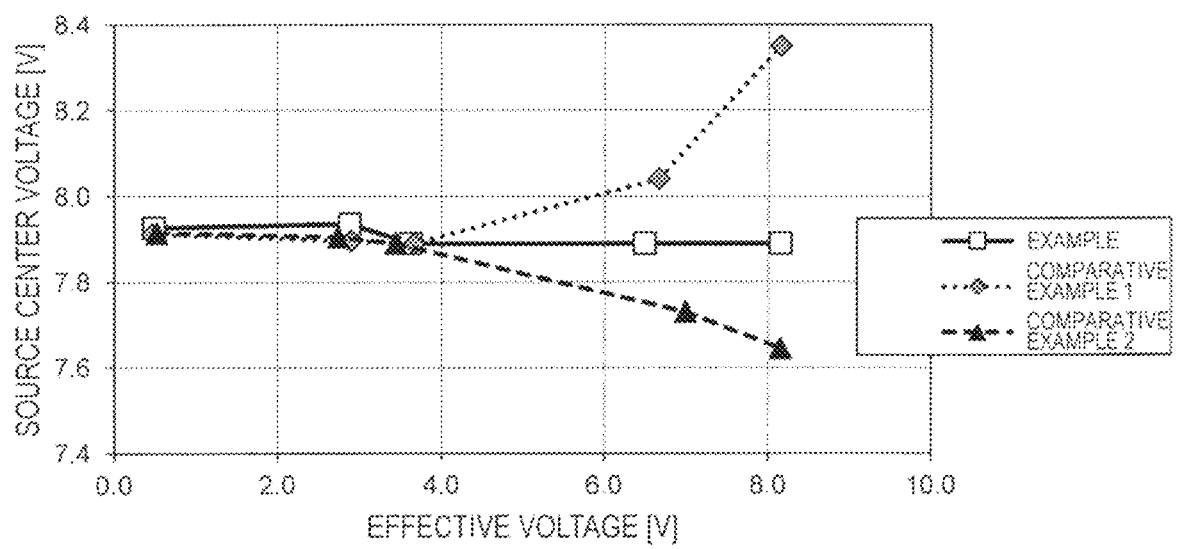
FIG. 6 is a graph showing a relationship between an effective voltage applied to a liquid crystal layer 30, and a source center voltage, in Example and Comparative Examples 1 and 2.

An example setting (Example) of the offset voltage in the liquid crystal display apparatus 100 of this embodiment will be described with reference to FIG. 6. FIG. is a graph showing a relationship between an effective voltage applied to the liquid crystal layer 30, and a source center voltage (the center value of the source voltage). A voltage obtained by subtracting the common voltage Vcom from the source center voltage is an offset voltage (offset amount). FIG. 6 shows a source center voltage in Example, and in addition, source center voltages in Comparative Examples 1 and 2. In Comparative Example 1, the source center voltage was obtained in the case where a conventional adjustment technique was performed. In Comparative Example 2, the source center voltage was obtained in a 4D-RTN mode liquid crystal display apparatus in which no slits were formed in a pixel electrode. The relationship between effective voltage and source center voltage in Example and Comparative Examples 1 and 2 are also shown in Tables 1, 2, and 3. In Tables 1, 2, and 3, the value of the common voltage Vcom in each example is also shown.

TABLE 1

Comparative Example 1

| Gray level (256-gray level representation: 8 bits) | Gray level (1024-gray level representation: 10 bits) | Effective voltage [V] | Source center voltage [V] | Common voltage [V] |
|---|---|---|---|---|
| 0 | 0 | 0.47 | 7.91 | 6.14 |
| 31 | 124 | 2.90 | 7.90 | |
| 127 | 508 | 3.66 | 7.89 | |
| 247 | 988 | 6.67 | 8.04 | |
| 255 | 1023 | 8.15 | 8.35 | |

TABLE 2

Comparative Example 2

| Gray level (256-gray level representation: 8 bits) | Gray level (1024-gray level representation: 10 bits) | Effective voltage [V] | Source center voltage [V] | Common voltage [V] |
|---|---|---|---|---|
| 0 | 0 | 0.52 | 7.92 | 6.27 |
| 31 | 124 | 2.73 | 7.91 | |
| 127 | 508 | 3.44 | 7.89 | |
| 247 | 988 | 7.00 | 7.73 | |
| 255 | 1023 | 8.15 | 7.65 | |

TABLE 3

Example

| Gray level (256-gray level representation: 8 bits) | Gray level (1024-gray level representation: 10 bits) | Effective voltage [V] | Source center voltage [V] | Common voltage [V] |
|---|---|---|---|---|
| 0 | 0 | 0.48 | 7.93 | 6.24 |
| 31 | 124 | 2.88 | 7.94 | |
| 127 | 508 | 3.62 | 7.89 | |
| 247 | 988 | 6.50 | 7.89 | |
| 255 | 1023 | 8.15 | 7.89 | |

In Comparative Example 1, as shown in FIG. 6 and Table 1, the source center voltage increases with an increase in the effective voltage in the range of greater than or equal to the effective voltage (3.66 V) corresponding to a gray level of 127/255. In other words, the offset amount increases (i.e., the offset voltage increases) with an increase in the gray level. This is because the DC offset caused by flexoelectric polarization increases with an increase in the effective voltage, so that such a large DC offset needs to be canceled.

Meanwhile, in Comparative Example 2, as shown in FIG. 6 and Table 2, the source center voltage does not increase (or rather, decreases) with an increase in the effective voltage in the range of greater than or equal to the effective voltage (3.44 V) corresponding to a gray level of 127/255. In other words, the offset amount decreases (i.e., the offset voltage decreases) with an increase in the gray level. It is considered that this is because no slits are formed in a pixel electrode, and therefore, flexoelectric polarization is less likely to occur, and it is not necessary to cancel the DC offset caused by flexoelectric polarization.

In contrast to Comparative Examples 1 and 2, in Example, as shown in FIG. 6 and Table 3, the source center voltage is the same (invariable) in the range of greater than or equal to the effective voltage (3.62 V) corresponding to a gray level of 127/255. In other words, the offset amount is the same (i.e., the offset voltage is the same).

The result of investigation of the degree of DC deviation in Example and Comparative Example 1 will now be described. The investigation was conducted as follows.

Figure 7:
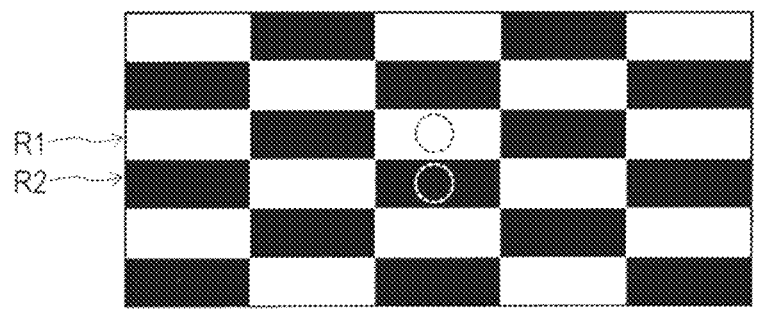
FIG. 7 is a diagram showing a black-and-white checker pattern used in investigation of the degree of occurrence of DC deviation in Example and Comparative Example 1.

Initially, in the liquid crystal display apparatuses of Example and Comparative Example 1, aging was performed in an environment of 25° C. with a black-and-white checker pattern shown in FIG. 7 kept displayed. At that time, the drive frequency was 60 Hz. The checker pattern was display including a first region R1 in which minimum-gray level (gray level of 0/255) display was performed, and a second region R2 in which maximum-gray level (gray level of 255/255) display was performed.

During the aging, the aging was interrupted and the optimum Vcom was measured at predetermined intervals. At each time, white display having a gray level of 32/255 was performed in the entire screen, and the optimum Vcom was measured at or near the center of the screen in regions (regions indicated by dashed-line circles in FIG. 7) corresponding to the first and second regions R1 and R2 during the aging. The difference between the optimum Vcom of the region corresponding to the first region R1 and the optimum Vcom of the region corresponding to the second region R2 is referred to as a "Vcom difference," and is used as an indicator for DC deviation.

Figure 8:
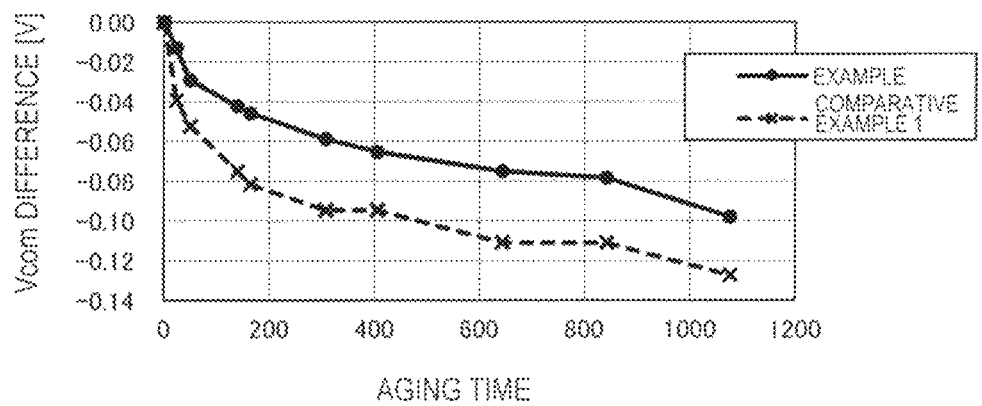
FIG. 8 is a graph showing changes in Vcom difference over time (relationship between aging time and Vcom difference) in Example and Comparative Example 1.

FIG. 8 shows the result of the investigation of DC deviation. FIG. 8 is a graph showing changes in Vcom difference over time (relationship between aging time and Vcom difference) in Example and Comparative Example 1.

As shown in FIG. 8, the increase in Vcom difference over time is smaller in Example than in Comparative Example 1. In other words, DC deviation is less likely to occur in Example than in Comparative Example 1.

Thus, in the liquid crystal display apparatus 100 of this embodiment, the occurrence of burn-in caused by DC deviation is prevented or reduced. Note that as can be seen from comparison of Example with Comparative Example 1 in FIG. 6, in the embodiment of the present invention, the DC offset caused by flexoelectric polarization is not sufficiently canceled for higher gray levels. If the DC offset caused by flexoelectric polarization is not sufficiently canceled, flicker is likely to occur. However, when the gray level is high, i.e., the luminance is sufficiently high, flicker is inherently less visible, and therefore, it can be said that a practical problem does not arise, even when the DC offset caused by flexoelectric polarization is not sufficiently canceled for higher gray levels.

Figure 9:
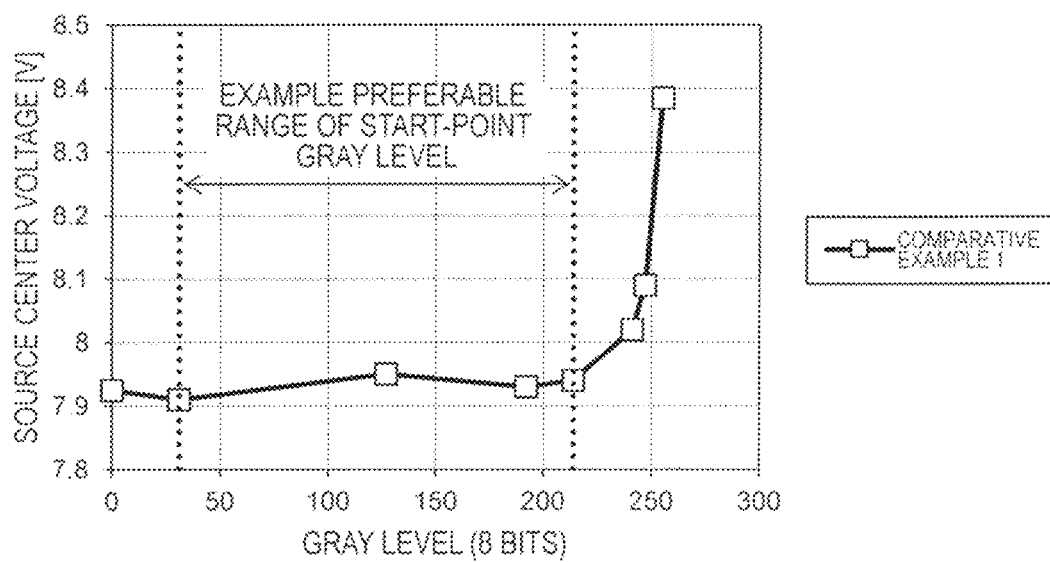
FIG. 9 is a graph showing a relationship between gray level (8 bits) and source center voltage in Comparative Example 1.

Although FIG. 6 shows an example in which the offset voltage is the same in the gray level range of greater than or equal to 127/255, the embodiment of the present invention is not limited to this. An intermediate gray level which is the lower limit (start point) of the range in which the offset voltage is substantially the same (hereinafter referred to as a "start-point gray level") is not particularly limited. Note that the start-point gray level is preferably higher than or equal to a gray level of 31/255, and is preferably lower than or equal to a gray level of 214/255. A reason for this will now be described with reference to FIG. 9. FIG. 9 is a graph showing a relationship between gray level (8 bits) and source center voltage in Comparative Example 1. FIG. 9 shows a preferable range of the start-point gray level.

In the case where the gray level is lower than 31/255, it may be difficult to measure percent flicker, and therefore, it may be difficult to determine the optimum Vcom based on the measurement of percent flicker. Therefore, in the case where the start-point gray level is lower than 31/255, it is difficult to determine the optimum Vcom, and therefore, it is likely to be difficult to set an appropriate offset amount. Therefore, the start-point gray level is preferably higher than or equal to 31/255.

In addition, as shown in FIG. 9, in Comparative Example 1, in the case where the gray level exceeds 214/255, there is a significant increase in the source center voltage (i.e., a significant increase in the offset voltage). This means that a significant DC deviation is likely to occur in the case where the gray level exceeds 214/255. Therefore, in order to prevent or reduce DC deviation in the gray level range exceeding 214/255, the start-point gray level is preferably lower than or equal to 214/255.

Note that the start-point gray level may be 0/255. In other words, the offset voltage may be substantially the same for all gray levels.

As described above, a reason for the occurrence of flexoelectric polarization is the presence of slits in a pixel electrode. Therefore, as the number of slits formed in a pixel electrode increases, i.e., the proportion of the area occupied by slits in a pixel electrode increases, the DC offset caused by flexoelectric polarization is more likely to occur. Therefore, it can be said that the embodiment of the present invention has a significant effect in the case where the proportion of the area occupied by the slits 11a in the pixel electrode 11 is relatively high (specifically, 30% or more).

Figure 10:
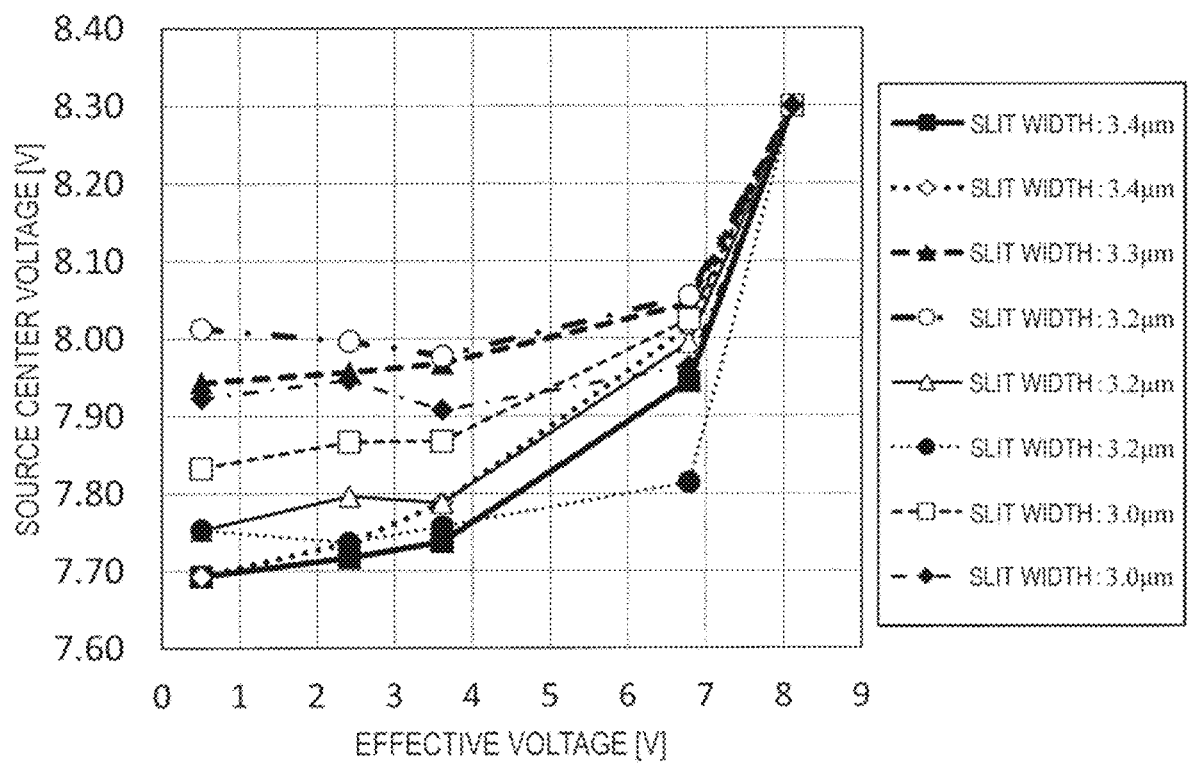

As described above, the width of the slit 11a in the pixel electrode 11 is not limited. DC deviation may occur irrespective of the width of the slit 11a. FIG. 10 is a graph showing a relationship between effective voltage and source center voltage in a liquid crystal display apparatus for which adjustment similar to that in Comparative Example 1 was performed, in a plurality of examples having different widths of the slit 11a.

As shown in FIG. 10, for higher gray levels, the source center voltage increases irrespective of the width of the slit 11a with an increase in the effective voltage. In other words, the offset amount increases (i.e., the offset voltage increases) with an increase in the gray level. This means that the DC offset caused by flexoelectric polarization increases with an increase in the effective voltage.

(Other Domain Arrangements)

The arrangement of the liquid crystal domains in the pixel P is not limited to the example of FIG. 3. In the example of FIG. 3, the liquid crystal domains A (the reference alignment direction is an about 225° direction), B (the reference alignment direction is an about 135° direction), C (the reference alignment direction is an about 315° direction), and D (the reference alignment direction is an about 45° direction) are arranged in this order in the lengthwise direction D1 of the pixel.

Figure 11:
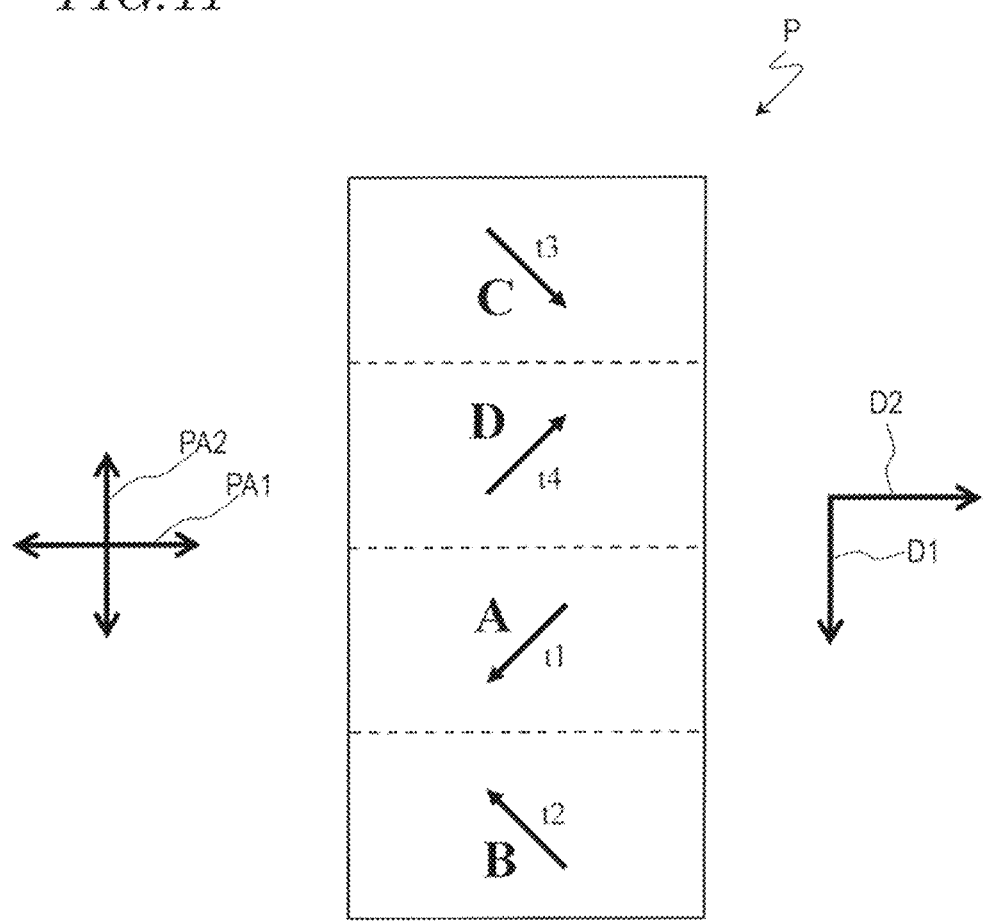
FIG. 11 is a diagram showing another example alignment division structure of the pixel P of the liquid crystal display apparatus 100.

In contrast to this, an arrangement shown in FIG. 11 may be employed. In the example of FIG. 11, in a pixel P, the liquid crystal domains C, D, A, and B are arranged downward (i.e., in the lengthwise direction D1 of the pixel) in this order. Even in the case where the arrangement of the example of FIG. 11 is employed, an effect can be obtained which is similar to that which is obtained in the case where the arrangement of FIG. 3 is employed.

[4D-RTN Mode Alignment Division Structure]

In the foregoing, the 4D-ECB mode has been illustrated. The embodiment of the present invention is not limited to the 4D-ECB mode, and may be applicable to a 4D-RTN mode liquid crystal display apparatus in which slits are formed in a pixel electrode. An alignment division structure in the 4D-RTN mode will be described.

Figure 12:
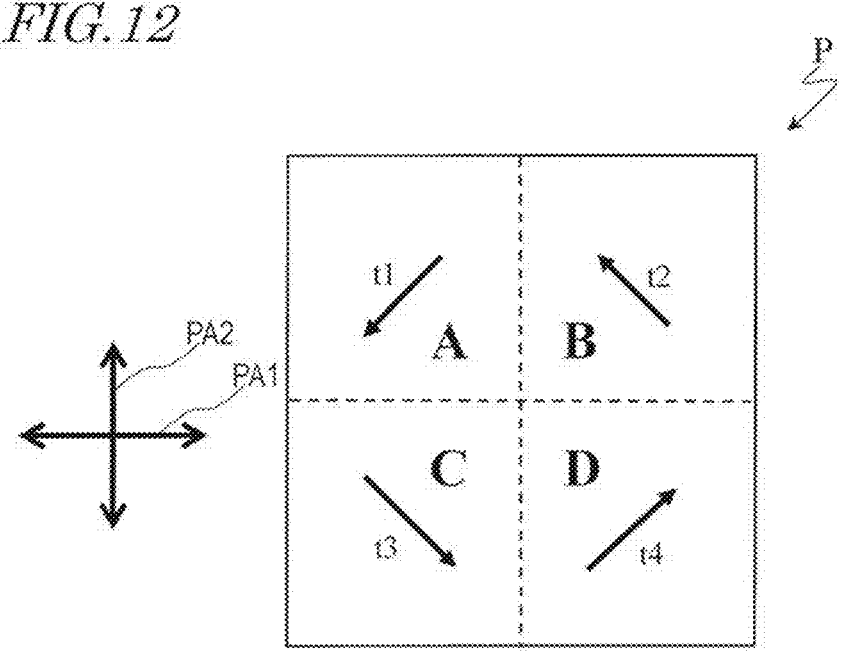
FIG. 12 is a diagram showing an alignment division structure of a pixel P in a 4D-RTN mode liquid crystal display apparatus.

FIG. 12 shows an alignment division structure of a pixel P in a 4D-RTN mode liquid crystal display apparatus. In the state that a voltage is applied to the liquid crystal layer, four liquid crystal domains A, B, C, and D are formed in the pixel P as shown in FIG. 12. The four liquid crystal domains A, B, C, and D are arranged in a matrix of two rows and two columns.

The angle between any two of the four azimuths of the directors t1, t2, t3, and t4 of the liquid crystal domains A, B, C, and D is substantially equal to an integer multiple of 90°. The azimuth of the director t1 of the liquid crystal domain A is an about 225° direction, the azimuth of the director t2 of the liquid crystal domain B is an about 135° direction, the azimuth of the director t3 of the liquid crystal domain C is an about 315° direction, and the azimuth of the director t4 of the liquid crystal domain D is an about 45° direction. In other words, the azimuths of the directors of two adjacent ones of the liquid crystal domains A, B, C, and D are about 90° different from each other.

An alignment division method for obtaining the alignment division structure of the pixel P of FIG. 12 will be described with reference to FIGS. 13A, 13B, and 13C. FIG. 13A shows pretilt directions PD1 and PD2 that are defined by an alignment film provided on an active matrix substrate. FIG. 13B shows pretilt directions PD3 and PD4 that are defined by an alignment film provided on a counter substrate. FIG. 13C shows tilted directions (directors) that are defined when a voltage is applied to a liquid crystal layer after the active matrix substrate and the counter substrate are attached together.

As shown in FIG. 13A, a region (region corresponding to a pixel P) of the active matrix substrate is vertically divided into two. The respective alignment films (vertical alignment films) of the regions (the left region and the right region) are subjected to an aligning process so as to be able to define antiparallel pretilt directions PD1 and PD2. Here, a photoaligning process is carried out by oblique irradiation with ultraviolet light (e.g., linear polarized ultraviolet light) in directions indicated by arrows.

Meanwhile, as shown in FIG. 13B, a region (region corresponding to a pixel P) of the counter substrate is horizontally divided into two. The respective alignment films (vertical alignment films) of the regions (the upper region and the lower region) are subjected to an aligning process so as to be able to define antiparallel pretilt directions PD3 and PD4. Here, a photoaligning process is carried out by oblique irradiation with ultraviolet light (e.g., linear polarized ultraviolet light) in directions indicated by arrows.

By attaching together the active matrix substrate and the counter substrate subjected to the aligning processes as shown in FIGS. 13A and 13B, an alignment division pixel P can be formed as shown in FIG. 13C. As can be seen from FIGS. 13A, 13B, and 13C, in each of the liquid crystal domains A-D, pretilt directions defined by the photoalignment film on the active matrix substrate are about 90° different from pretilt directions defined by the photoalignment film on the counter substrate, and tilted directions (the azimuths of directors in the liquid crystal domains) are defined that are an intermediate direction between the two pretilt directions.

In addition, as shown in FIG. 13C, in the pixel P having the alignment division structure, dark lines DL1-DL8 occur. The dark lines DL1-DL8 include dark lines DL1-DL4 that each occur at a boundary between adjacent liquid crystal domains, and dark lines DL5-DL8 that occur near edges of the pixel electrode. In the example of FIG. 13C, the dark lines DL1-DL8 together form a right-facing swastika shape.

Figure 14:
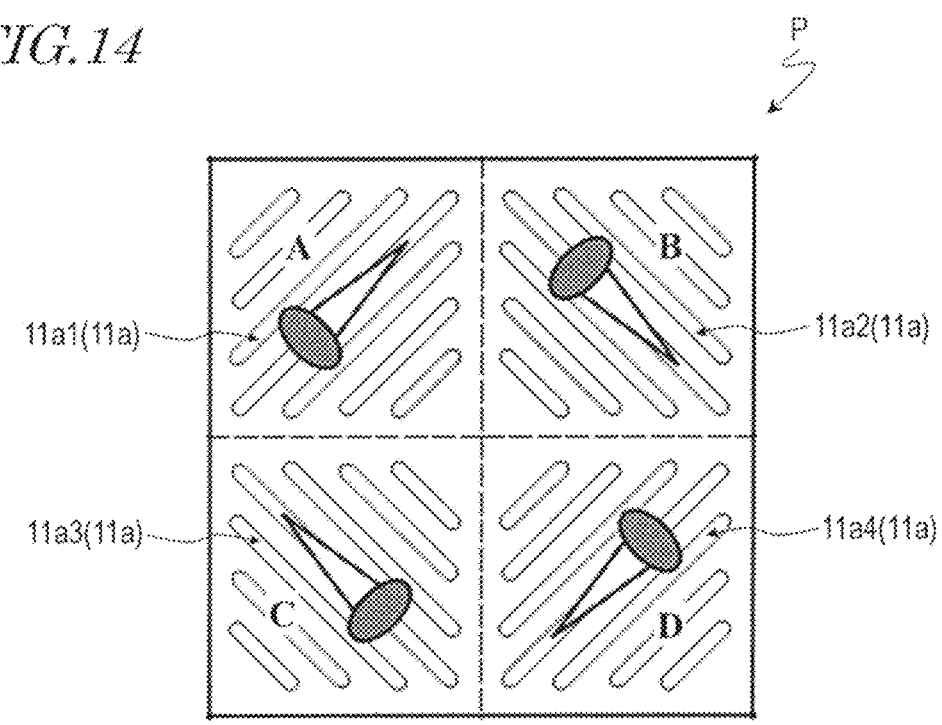
FIG. 14 is a diagram showing a relationship between the directions in which slits 11a formed in a pixel electrode 11 extend, and tilted directions in liquid crystal domains A-D.

FIG. 14 shows a relationship between the directions in which slits 11a in the pixel electrode 11 extend, and tilted directions in the liquid crystal domains A-D, in the case where the alignment division structure of FIG. 12 is employed.

As shown in FIG. 14, the plurality of slits 11a include first slits 11a1 formed in a region corresponding to the liquid crystal domain A, second slits 11a2 formed in a region corresponding to the liquid crystal domain B, third slit 11a3 formed in a region corresponding to the liquid crystal domain C, and fourth slits 11a4 formed in a region corresponding to the liquid crystal domain D.

The first slits 11a1 extend substantially in parallel to the tilted direction in the liquid crystal domain A, and the second slits 11a2 extend substantially in parallel to the tilted direction in the liquid crystal domain B. The third slits 11a3 extend substantially in parallel to the tilted direction in the liquid crystal domain C, and the fourth slits 11a4 extend substantially in parallel to the tilted direction in the liquid crystal domain D.

As described above, the slits 11a1, 11a2, 11a3, and 11a4 thus formed in the pixel electrode 11, extending substantially in parallel to the tilted directions of the respective corresponding liquid crystal domains, can reduce the width of dark lines and thereby improve transmittance.

A liquid crystal display apparatus according to an embodiment of the present invention is suitably used in applications such as television sets in which high-quality display is required.

The present application claims the benefit of U.S. Provisional Application No. 62/817,310 filed on Mar. 12, 2019, the disclosure of which is hereby incorporated by reference in its entirety.

What is claimed is:

1. A liquid crystal display apparatus comprising:
a liquid crystal display panel having a plurality of pixels, and having a first substrate, a second substrate facing the first substrate, and a vertical alignment type liquid crystal layer provided between the first and second substrates; and
a control circuit configured to receive an input display signal indicating gray levels to be represented by the plurality of pixels, and generate a display signal voltage to be supplied to each of the plurality of pixels,
wherein
the first substrate has a pixel electrode provided for each of the plurality of pixels, the display signal voltage being applied to the pixel electrode, and a first alignment film provided between the pixel electrodes and the liquid crystal layer,
the second substrate has a counter electrode facing the pixel electrode, a common voltage being applied to the counter electrode, and a second alignment film provided between the counter electrode and the liquid crystal layer,
each of the plurality of pixels has a plurality of liquid crystal domains having different reference alignment directions defined by the first and second alignment films,
the pixel electrode has a plurality of slits,
the control circuit is configured to generate, as the display signal voltage, a voltage obtained by adding a predetermined offset voltage to an original voltage corresponding to a gray level,
offset voltages for two or more gray levels lower than a predetermined intermediate gray level are different from each other, and the offset voltages are substantially the same for gray levels higher than or equal to the predetermined intermediate gray level.

2. The liquid crystal display apparatus according to claim 1, wherein
the predetermined intermediate gray level is higher than or equal to a gray level of 31/255.

3. The liquid crystal display apparatus according to claim 1, wherein
the predetermined intermediate gray level is lower than or equal to a gray level of 214/255.

4. The liquid crystal display apparatus according to claim 1, wherein
the first and second alignment films are each a photoalignment film.

5. The liquid crystal display apparatus according to claim 1, wherein
in each of the plurality of liquid crystal domains, a pretilt direction defined by the first alignment film is substantially antiparallel to a pretilt direction defined by the second alignment film.

6. The liquid crystal display apparatus according to claim 1, wherein
the offset voltages increase or decrease in a predetermined gray level range lower than the predetermined intermediate gray level.

7. A liquid crystal display apparatus comprising:
a liquid crystal display panel having a plurality of pixels, and having a first substrate, a second substrate facing the first substrate, and a vertical alignment type liquid crystal layer provided between the first and second substrates; and
a control circuit configured to receive an input display signal indicating gray levels to be represented by the plurality of pixels, and generate a display signal voltage to be supplied to each of the plurality of pixels,
wherein:
the first substrate has a pixel electrode provided for each of the plurality of pixels, the display signal voltage being applied to the pixel electrode, and a first alignment film provided between the pixel electrodes and the liquid crystal layer;
the second substrate has a counter electrode facing the pixel electrode, a common voltage being applied to the counter electrode, and a second alignment film provided between the counter electrode and the liquid crystal layer;
each of the plurality of pixels has a plurality of liquid crystal domains having different reference alignment directions defined by the first and second alignment films,
the pixel electrode has a plurality of slits;
the control circuit is configured to generate, as the display signal voltage, a voltage obtained by adding a predetermined offset voltage to an original voltage corresponding to a gray level;
offset voltages are substantially the same for all gray levels; and
the offset voltages are not zero for all gray levels.

8. The liquid crystal display apparatus according to claim 1, wherein
the plurality of liquid crystal domains include a first liquid crystal domain in which the reference alignment direction is a first direction, a second liquid crystal domain in which the reference alignment direction is a second direction different from the first direction, a third liquid crystal domain in which the reference alignment direction is a third direction different from the first and second directions, and a fourth liquid crystal domain in which the reference alignment direction is a fourth direction different from the first, second, and third directions.

9. The liquid crystal display apparatus according to claim 8, wherein
the plurality of slits include a first slit which is formed in a region corresponding to the first liquid crystal domain, extending substantially in parallel to the first direction, a second slit which is formed in a region corresponding to the second liquid crystal domain, extending substantially in parallel to the second direction, a third slit which is formed in a region corresponding to the third liquid crystal domain, extending substantially in parallel to the third direction, and a fourth slit which is formed in a region corresponding to the fourth liquid crystal domain, extending substantially in parallel to the fourth direction.

10. The liquid crystal display apparatus according to claim 8, wherein
in each of the plurality of pixels, the first, second, third, and fourth liquid crystal domains are arranged in a pixel lengthwise direction.

* * * * *